(12) United States Patent
Wang et al.

(10) Patent No.: US 11,582,074 B2
(45) Date of Patent: Feb. 14, 2023

(54) CTLE ADAPTATION BASED ON STATISTICAL ANALYSIS

(71) Applicant: Rambus Inc., San Jose, CA (US)

(72) Inventors: Nanyan Wang, Cupertino, CA (US); Vadim Moshinsky, Thornhill (CA); Prashant Choudhary, Milpitas, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/576,501

(22) Filed: Jan. 14, 2022

(65) Prior Publication Data
US 2022/0217025 A1    Jul. 7, 2022

Related U.S. Application Data

(63) Continuation of application No. 17/181,883, filed on Feb. 22, 2021, now Pat. No. 11,258,641.
(Continued)

(51) Int. Cl.
*H04L 25/03* (2006.01)
*H04L 27/02* (2006.01)

(52) U.S. Cl.
CPC ........ *H04L 25/03885* (2013.01); *H04L 27/02* (2013.01)

(58) Field of Classification Search
CPC ........ H03H 21/0012; H04B 3/143–148; H04L 25/026; H04L 25/0264; H04L 25/0286; H04L 25/0292; H04L 25/03006; H04L 25/03019; H04L 25/03057; H04L 25/03076; H04L 25/03878; H04L 25/03885; H04L 2025/03592; H04L 2025/03611; H04L 27/01; H04L 27/02

USPC ....... 375/229, 232, 233, 236, 346, 348, 350, 375/353; 331/28 R, 165–167; 708/322, 708/323
See application file for complete search history.

(56) References Cited

U.S. PATENT DOCUMENTS 8,958,512 B1    2/2015  Ding et al.
9,800,438 B1   10/2017  Zhang et al.
(Continued)

OTHER PUBLICATIONS

Frans et al., "A 56-Gb/s PAM4 Wireline Transceiver Using a 32-Way Time-Interleaved SAR ADC in 16-nm FinFET," IEEE Journal of Solid-State Circuits. vol. 52, No. 4, pp. 1101-1110, Apr. 2017. (Year: 2017).*

*Primary Examiner* — Young T. Tse
(74) *Attorney, Agent, or Firm* — The Neudeck Law Firm, LLC

(57) ABSTRACT

Optimized continuous time linear equalization (CTLE) circuit parameters for a received signal are found using an iterative search process. The received signal is repeatedly sampled by an analog-to-digital converter (ADC). Certain samples containing interference that cannot be cancelled by a CTLE in the sampled series are filtered out (discarded). The remaining samples are used to generate, over a selected evaluation window, a histogram of the sampled values. This histogram is used to calculate a figure of merit for the current CTLE parameter settings. The figures of merit for various CTLE parameter settings are compared to find the set of CTLE parameter settings that optimize the figure of merit and by extension, optimize the CTLE circuitry's performance at equalizing the received signal.

20 Claims, 13 Drawing Sheets

Related U.S. Application Data

(60) Provisional application No. 62/985,016, filed on Mar. 4, 2020.

(56) References Cited

U.S. PATENT DOCUMENTS

| | | | |
|---|---|---|---|
| 9,806,915 B1* | 10/2017 | Elzeftawi | H04L 25/03019 |
| 10,608,848 B1 | 3/2020 | Azenkot | |
| 2013/0148712 A1* | 6/2013 | Malipatil | H04L 7/033 |
| | | | 375/233 |
| 2013/0169314 A1 | 7/2013 | Choudhary et al. | |
| 2013/0322506 A1 | 12/2013 | Zerbe et al. | |
| 2014/0064351 A1 | 3/2014 | Hidaka | |
| 2014/0269881 A1 | 9/2014 | He et al. | |
| 2016/0352557 A1 | 12/2016 | Liao et al. | |
| 2018/0069690 A1 | 3/2018 | Chattopadhyay et al. | |
| 2018/0287837 A1 | 10/2018 | Zhang et al. | |
| 2020/0252248 A1 | 8/2020 | Palusa et al. | |

\* cited by examiner

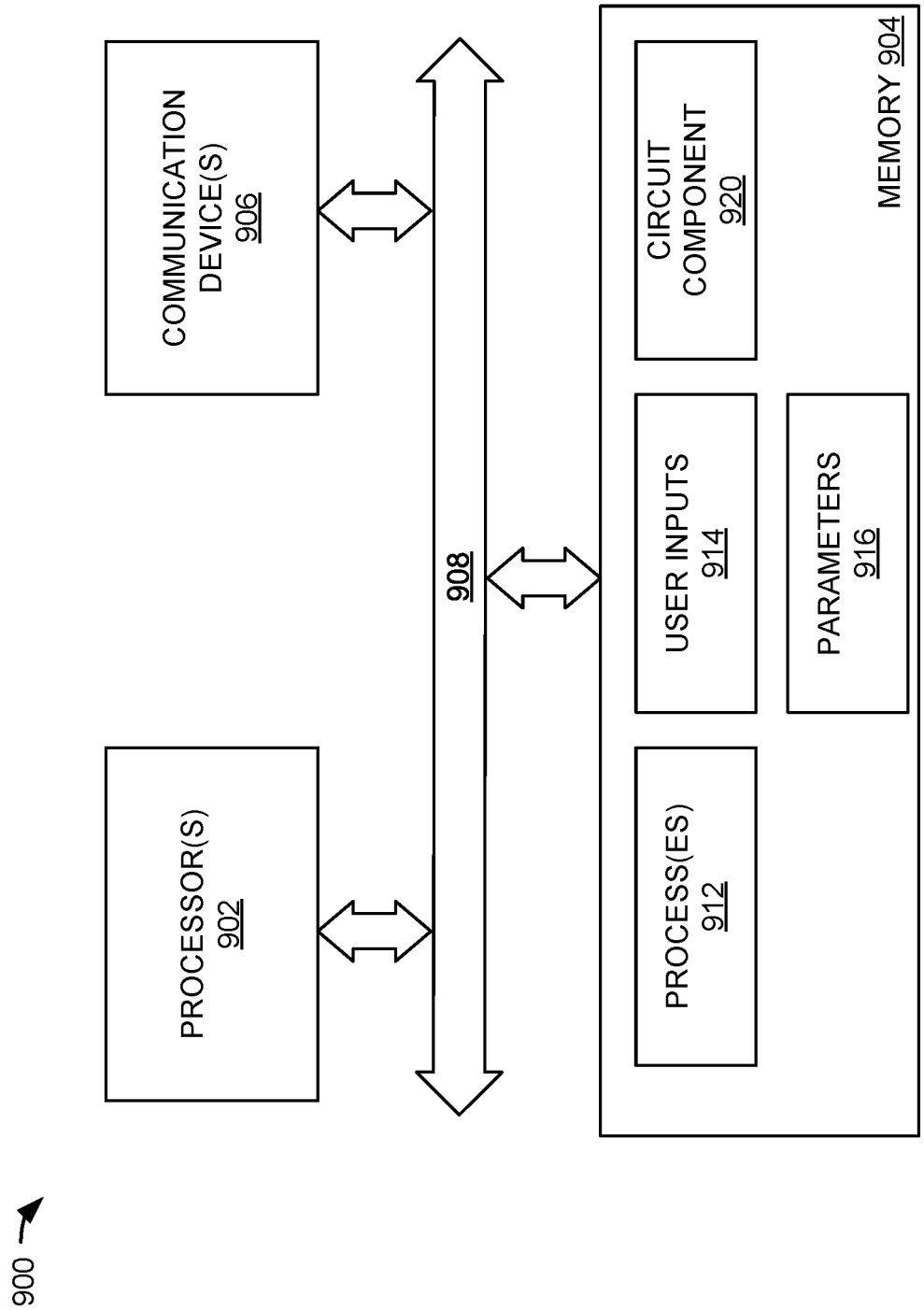

CTLE ADAPTATION BASED ON STATISTICAL ANALYSIS

BRIEF DESCRIPTION OF THE DRAWINGS

FIG. 9 is a block diagram illustrating a processing system.

DETAILED DESCRIPTION OF THE EMBODIMENTS

Serial data channels attenuate transmitted signals. Most channels attenuate the high frequency components of the signals more than the low frequency components. Continuous time linear equalization (CTLE) circuitry at the receiver boosts the higher-frequency components of the received signal in an attempt to bring the low and high frequency components to similar amplitudes. This helps improve eye diagram performance. However, since each channel may have different attenuation characteristics (e.g., amplitude, cutoff frequency, and slope), a single set of fixed CTLE parameters (e.g., low-frequency gain, high-frequency boost) is sub-optimal for many channels.

In an embodiment, optimized CTLE parameters for a received signal are found using an iterative search process. The received signal is repeatedly sampled by an analog-to-digital converter (ADC). Certain samples in the series are filtered out (discarded) because they are likely to include a large component of pre-cursor inter-symbol interference (ISI) which cannot be cancelled by CTLE. The remaining samples are used to generate, over a selected evaluation window, a histogram of the sampled values. This histogram is used to calculate a figure of merit for the current CTLE parameter settings. The figures of merit for various CTLE parameter settings are compared to find the set of CTLE parameter settings that optimize the figure of merit and by extension, optimize the CTLE circuitry's performance at equalizing the received signal.

Figure 1:
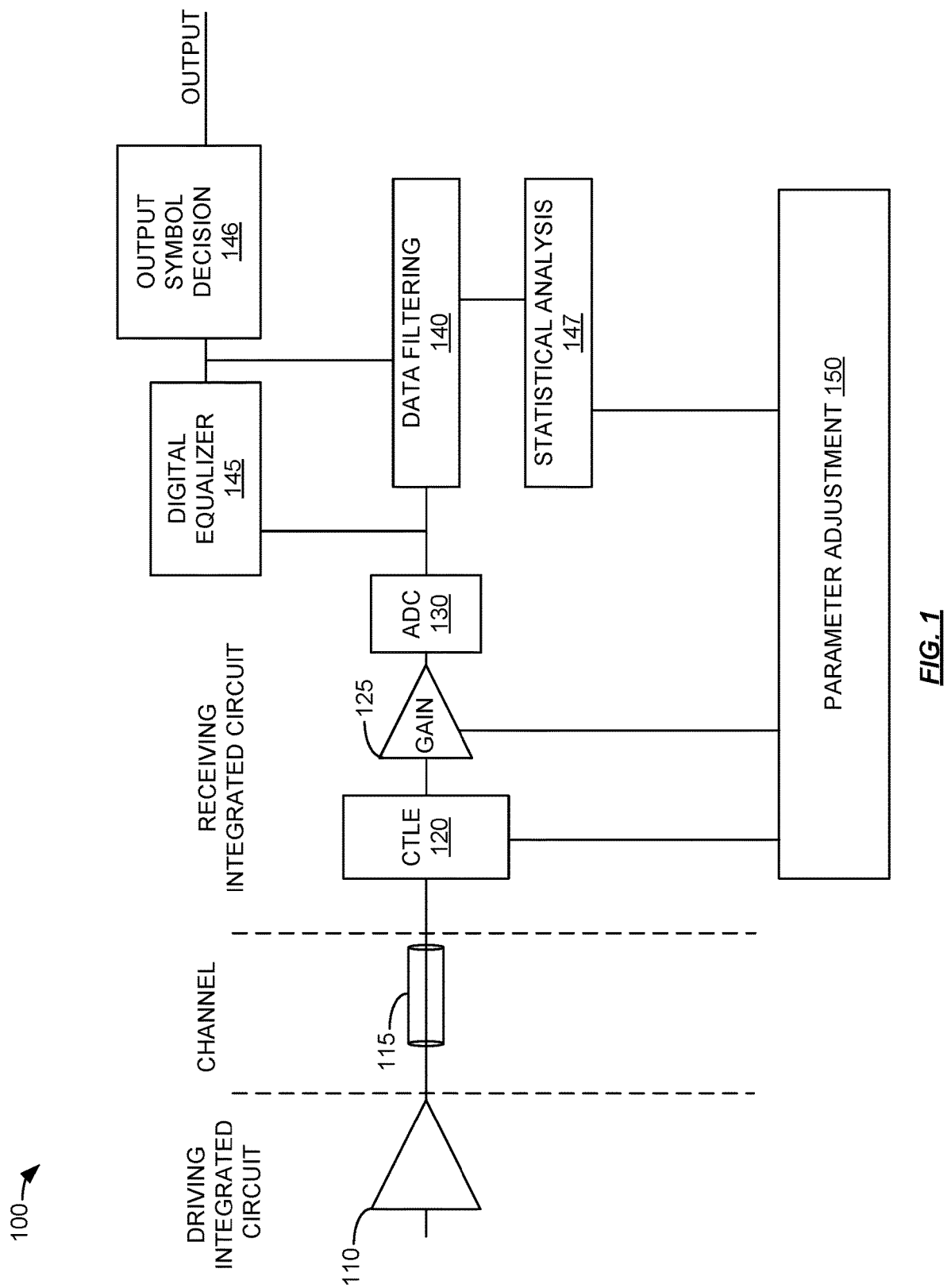
FIG. 1 is a block diagram of a communication system.

FIG. 1 is a block diagram of a communication system. Signaling system 100 comprises a driving integrated circuit, a receiving integrated circuit, and interconnect channel between them. The driving integrated circuit includes transmitter circuit 110 (a.k.a., driver 110). The receiver integrated circuit includes receiver circuit continuous time linear equalizer (CTLE) circuitry 120, input gain circuitry 125, analog-to-digital converter (ADC) 130, data filtering circuitry 140, digital equalizer circuitry 145, output symbol decision circuitry 146, statistical analysis 147, and parameter adjustment 150.

CTLE circuitry is operatively coupled to input gain circuitry 125. CTLE circuitry is operatively coupled to input gain circuitry 125 to provide a signal to input gain circuitry 125. Input gain circuitry 125 is operatively coupled to ADC 130. Input gain circuitry 125 is operatively coupled to ADC 130 to provide a gain adjusted (amplified or attenuated) signal to ADC 130. The output of ADC 130 is operatively coupled to digital equalizer circuitry 145 and data filtering circuitry 140. The output of digital equalizer circuitry 145 may also be provided to data filtering circuitry 140.

The output of data filtering circuitry 140 is provided to statistical analysis 147. The output of statistical analysis is provided to parameter adjustment 150. Parameter adjustment 150 may control one or more parameters of CTLE circuitry 120 and/or input gain circuitry 125. Parameter adjustment 150 may control one or more parameters of CTLE circuitry 120 and/or input gain circuitry 125 to optimize (i.e., maximize or minimize) an objective function and/or figure of merit.

The output of digital equalizer circuitry 145 is provided to output symbol decision circuitry 146 and data filtering circuitry 140. The output of output symbol decision circuitry 146 may be used as an output that is provided to additional circuitry on the receiving integrated circuit.

In FIG. 1, the interconnect channel between driver 110 of the driving integrated circuit and CTLE circuitry of the receiving integrated circuit comprises interconnect system 115. Interconnect system 115 would typically comprise a printed circuit (PC) board, connector, cable, flex circuit, other substrate, and/or a combination of these. Interconnect system 115 may be and/or include one or more transmission lines. It should also be understood that although system 100 is illustrated as transmitting a single-ended signal transmitted a single transmission line, the signals sent by the driving integrated circuit of system 100 may be a pair of differential signals transmitted using two transmission lines. In an embodiment, the signal transmitted by the driving integrated circuit are a pair of differential signals using PAM-4 signaling.

CTLE circuitry 120 is operatively coupled to interconnect system 115. CTLE circuitry 120 is operatively coupled to interconnect system 115 to receive signals transmitted by driver 110. The signals transmitted by driver 110 may be attenuated by interconnect system 115. The high-frequency components of the signals transmitted by driver 110 may be attenuated more by interconnect system 115 than the low-frequency components of the signals transmitted by driver 110. CTLE circuitry 120 boosts the higher-frequency components of the received signal in an attempt to bring the low and high frequency components to similar amplitudes.

CTLE 120 has parameters that may be set by values received from parameter adjustment 150. In particular, parameter adjustment 150 may set the low-frequency gain (or attenuation) and/or the high-frequency boost (i.e., gain relative to the low-frequencies) of CTLE circuitry 120. In some embodiments, parameter adjustment may set one or more filter poles that determine the crossover between the low-frequency response and the high-frequency response of CTLE circuitry 120.

CTLE circuitry 120 is operatively coupled to the input of input gain circuitry 125. Input gain circuitry 125 amplifies both the high-frequency and low-frequency components of the signals received from CTLE circuitry 120. The output signal of input gain circuitry 125 is provided to ADC 130. ADC 130 repeatedly samples the signal from input gain circuitry 125 to produce a series of digital sample values (a.k.a., samples or sample values.) In an embodiment, ADC 130 is a 6-bit ADC that quantizes the signal from input gain circuitry 125 into one of 64 possible digital sample values. The series of digital samples are provided to data filtering circuitry 140 and digital equalizer circuitry 145.

Data filtering circuitry 140 receives samples in the series and uses the value of the samples to assign symbol decisions (i.e., symbols) to those samples. For a PAM-4 symbol, data filtering assigns one of the four PAM-4 symbols $s_0$, $s_1$, $s_2$, and $s_3$ based on the value received from ADC 130. Based on the symbol decision assigned to a succeeding sample, data filtering circuitry 140 determines whether to pass the current sampled value on to statistical analysis 147. In other words, whether a particular sampled value is passed on to statistical analysis 147 is determined by the symbol decision made about the succeeding sample.

In an embodiment, if the symbol decision for the succeeding sample is $s_0$ or $s_3$, the current sample value will not be passed on to statistical analysis 147 by data filtering circuitry 140. The symbols $s_0$ and $s_3$ are associated with the worst case pre-cursor ISI. Thus, by removing samples immediately preceding $s_0$ and $s_3$ from the series of samples provided to parameter adjustment 150, parameter adjustment 150 will base its decisions/adjustments/etc. on a series of samples with less pre-cursor ISI than the series of samples from ADC 130. This is further illustrated with reference to FIGS. 2A-2B.

Figure 2A:
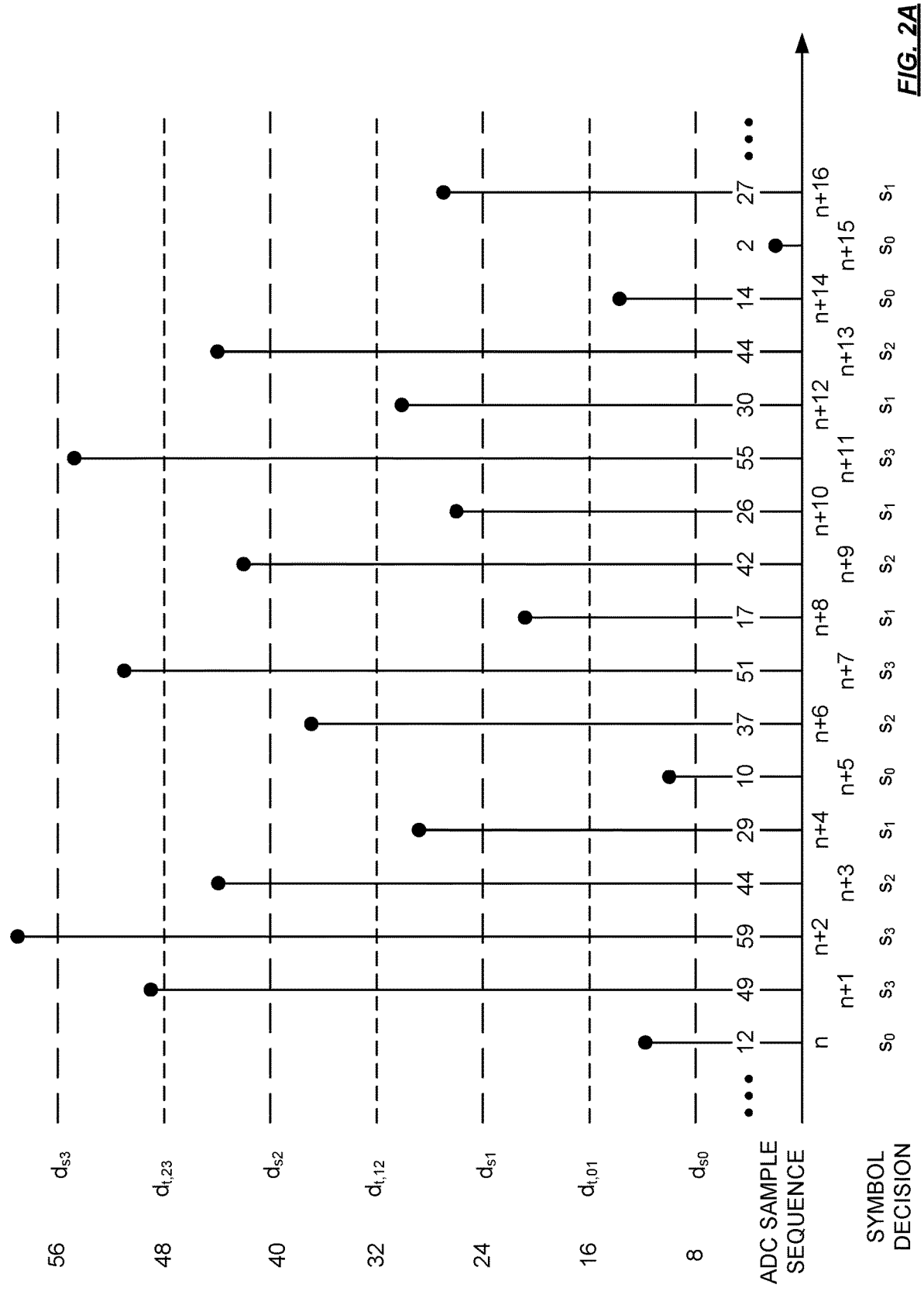
FIG. 2A is an illustration of an example sampled signal sequence.

FIG. 2A is an illustration of an example sampled signal sequence. In FIG. 2A, an example series of samples n through n+16 along the horizontal axis. The value (amplitude) of each of the series of samples is illustrated by the height of the line associated with that sample in the vertical direction. The digital value of the sample is also shown as a number bisected by its line. Finally, the symbol decision associated with that sample is shown below the n to n+16 numbering along the horizontal axis. Horizontal dashed lines spread out in the vertical direction illustrate various noteworthy values. In particular, the horizontal line labeled $d_{s0}$ illustrates the ADC 130 output value associated with the mean symbol level (i.e., with no ISI) value that would be output when an $s_0$ symbol is received; the line labeled $d_{s1}$ illustrates the ADC 130 output value associated with the mean symbol level value that would be output when an $s_1$ symbol is received; and so on for lines $d_{s2}$ and $d_{s3}$ for symbols $s_2$ and $s_3$, respectively. The horizontal lines labeled $d_{t,01}$, $d_{t,12}$, and $d_{t,23}$ represent the decision threshold values between symbols $s_0$ and $s_1$, $s_1$ and $s_2$, and $s_2$ and $s_3$, respectively.

Figure 2B:
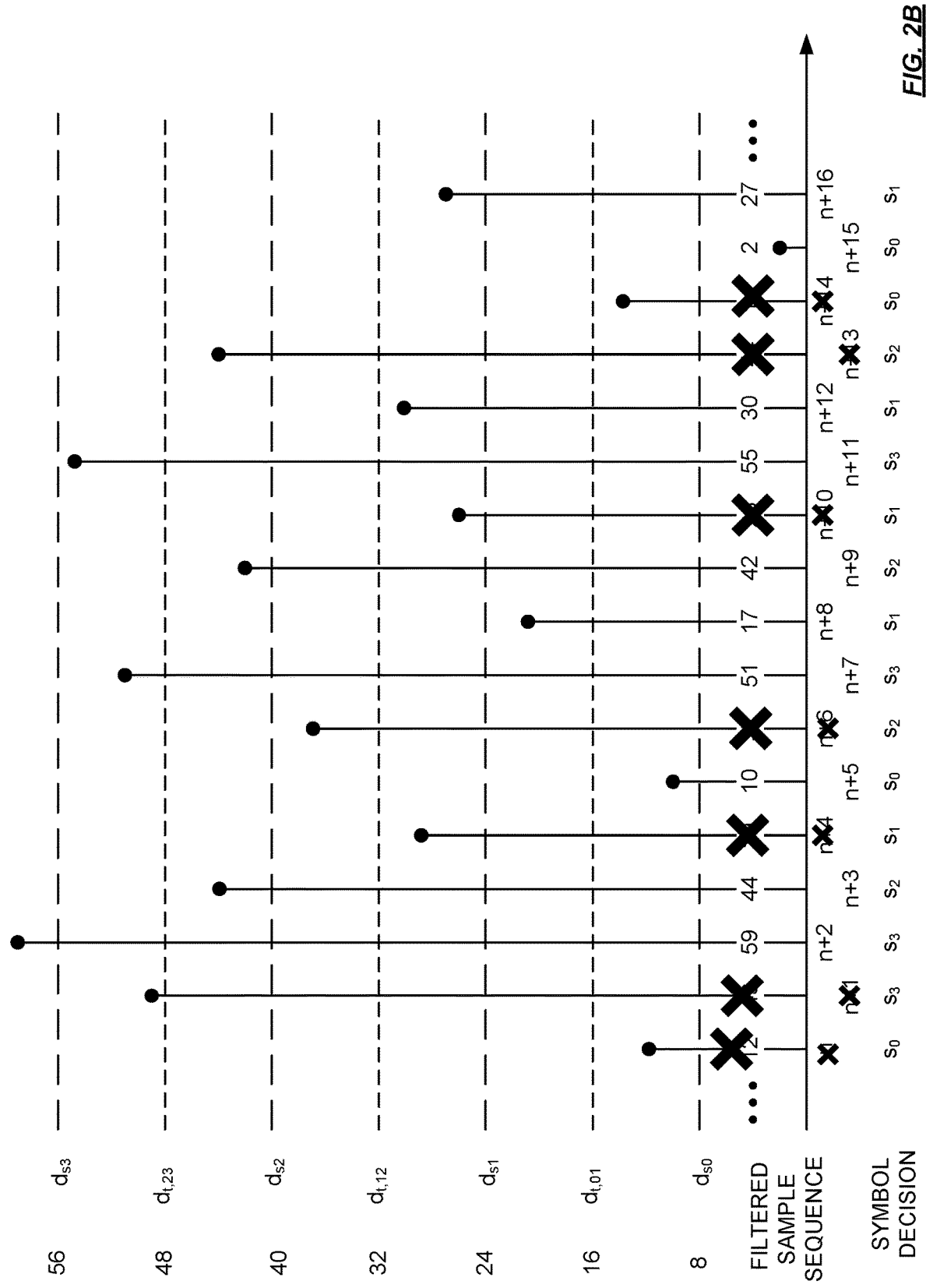
FIG. 2B is an illustration of a data filtered example sampled signal sequence.

As discussed herein, if the symbol decision for the succeeding sample is $s_0$ or $s_3$, the current sample value will not be passed on to statistical analysis 147 by data filtering circuitry 140. This is illustrated in FIG. 2B by the "X"'s over samples that are not passed to statistical analysis 147. The filtering illustrated in FIG. 2B is also detailed in Table 1.

TABLE 1

| Sample # | ADC output value | Symbol decision | succeeding symbol decision | Value passed to statistical analysis 147 |
| --- | --- | --- | --- | --- |
| n | 12 | $s_0$ | $s_3$ | none |
| n + 1 | 49 | $s_3$ | $s_3$ | none |
| n + 2 | 59 | $s_3$ | $s_2$ | 59 |
| n + 3 | 44 | $s_2$ | $s_1$ | 44 |
| n + 4 | 29 | $s_1$ | $s_0$ | none |
| n + 5 | 10 | $s_0$ | $s_2$ | 10 |
| n + 6 | 37 | $s_2$ | $s_3$ | none |

TABLE 1-continued

| Sample # | ADC output value | Symbol decision | succeeding symbol decision | Value passed to statistical analysis 147 |
| --- | --- | --- | --- | --- |
| n + 7 | 51 | $s_3$ | $s_1$ | 51 |
| n + 8 | 17 | $s_1$ | $s_2$ | 17 |
| n + 9 | 42 | $s_2$ | $s_1$ | 42 |
| n + 10 | 26 | $s_1$ | $s_3$ | none |
| n + 11 | 55 | $s_3$ | $s_1$ | 55 |
| n + 12 | 30 | $s_1$ | $s_2$ | 30 |
| n + 13 | 44 | $s_2$ | $s_0$ | none |
| n + 14 | 14 | $s_0$ | $s_0$ | none |
| n + 15 | 2 | $s_0$ | $s_1$ | 2 |
| n + 16 | 27 | $s_1$ | n/a | none |

Statistical analysis 147 receives the filtered sequence of sample values and, over an evaluation window (i.e., sampling window based on number of samples, time, etc.), and generates a histogram of sample values received. The histograms generated by statistical analysis 147 are provided to parameter adjustment 150. In an embodiment, the size of the evaluation window may be configured in a register writable by an external host system (not shown in the Figures.)

Figure 3A:
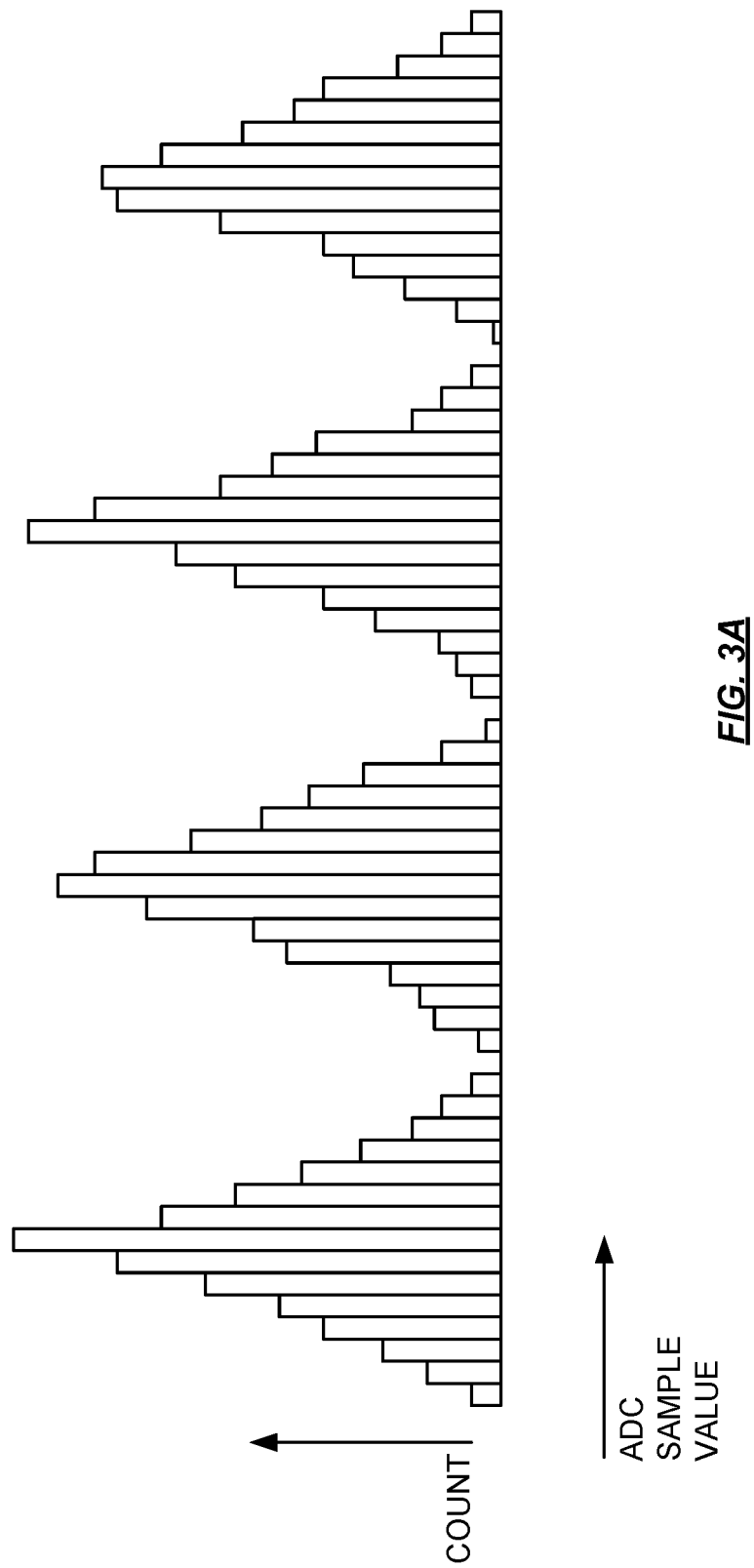
FIGS. 3A-3B are illustrations of a sampled signal histogram.

FIG. 3A illustrates an example sampled signal histogram. Ranges of histogram bins to be used for a figure of merit calculation by parameter adjustment 150 are selected. In an embodiment, parameter adjustment 150 selects ranges of histogram bins around the ADC 130 output values associated with the mean symbol level (i.e., with no ISI) values that would be output by ADC 130 when a respective symbol s0, s1, s2, and s3 symbol is received. These bins are used by parameter adjustment 150 for the figure of merit calculation. In other words, a range of histogram bins around the values ds0, ds1, ds2, and ds3 as illustrated in FIGS. 2A-2B are selected by parameter adjustment 150 to be used for the figure of merit calculation.

Figure 3B:
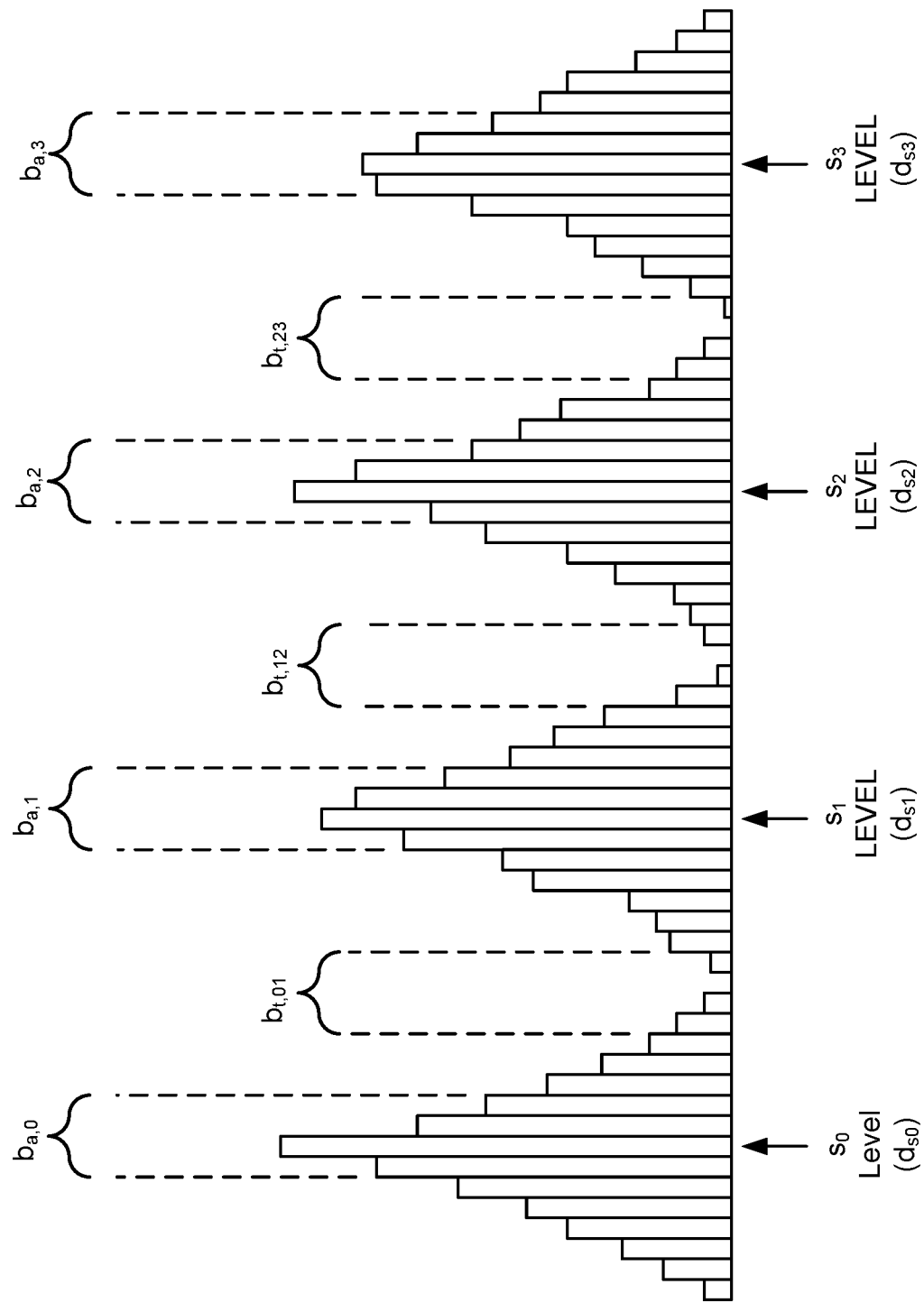

In an embodiment, as illustrated in FIG. 3B, the range of bins selected by parameter adjustment 150 runs from the mean symbol level value bin minus one bin to the mean symbol level value bin plus two bins. In other words, bin range $b_{a,0}$ which is associated with the $s_0$ symbol level includes the bins associated with the ADC 130 output values $d_{s0}-1$ to $d_{s0}+2$; bin range $b_{a,1}$ which is associated with the $s_1$ symbol level includes the bins associated with the ADC 130 output values $d_{s1}-1$ to $d_{s1}+2$; bin range $b_{a,2}$ which is associated with the $s_2$ symbol level includes the bins associated with the ADC 130 output values $d_{s2}-1$ to $d_{s2}+2$; and, bin range $b_{a,3}$ which is associated with the $s_3$ symbol level includes the bins associated with the ADC 130 output values $d_{s3}-1$ to $d_{s3}+2$. It should be understood that these ranges of 4 bins (e.g., −1, 0, +1, +2 around a given mean symbol value $d_{sx}$) are merely one embodiment. In other embodiments not shown in FIG. 3B, greater or fewer bins, different numbers of bins for different decision levels, etc. may be selected by parameter adjustment 150 to be used for the figure of merit calculation.

Parameter adjustment 150 also selects ranges of histogram bins around the ADC 130 output values associated with the decision threshold values between respective symbols $s_0$, $s_1$, $s_2$, and $s_3$. These bins are also used for the figure of merit calculation. In other words, a range of histogram bins around the values $d_{t,01}$, $d_{t,12}$, and $d_{t,13}$, as illustrated in FIGS. 2A-2B, are selected to be used for the figure of merit calculation.

In an embodiment, parameter adjustment 150 selects the range of bins from the decision threshold bin minus one bin to the ideal value bin plus two bins. In other words, as illustrated in FIG. 3B, bin range $b_{t,01}$ which is associated with decision level between the $s_0$ and $s_1$ symbols includes the bins associated with the ADC 130 output values $d_{t,01}-1$ to $d_{t,01}+2$; bin range $b_{t,12}$ which is associated with the decision level between the $s_1$ and $s_2$ symbols includes the bins associated with the ADC 130 output values $d_{t,12}-1$ to $d_{t,12}+2$; and, bin range $b_{t,23}$ which is associated with decision level between the $s_2$ and $s_3$ symbols includes the bins associated with the ADC 130 output values $d_{t,23}-1$ to $d_{t,23}+2$. These selections may also be expressed in terms of the mean symbol level as follows:

$$binV_{min}^m =$$

$$\begin{cases} \text{round}\left[\frac{b_{a,0}+b_{a,1}}{2}\right]-1, & m = 01 \text{ for decision level between } s_0 \text{ and } s_1 \\ \text{round}\left[\frac{b_{a,1}+b_{a,2}}{2}\right]-1, & m = 12 \text{ for decision level between } s_1 \text{ and } s_2 \\ \text{round}\left[\frac{b_{a,2}+b_{a,3}}{2}\right]-1, & m = 23 \text{ for decision level between } s_2 \text{ and } s_3 \end{cases}$$

and, $binV_{max}^m = V_{min}^m + 2$.

It should be understood that these ranges of 4 bins (e.g., $-1$, $0$, $+1$, $+2$ around a given decision threshold $d_{t,xy}$) are merely one embodiment. In other embodiments not illustrated in FIG. 3B, greater or fewer bins, different numbers of bins for different decision levels, etc. may be selected to be used for the figure of merit calculation.

To calculate the figure of merit for a given set of CTLE parameters, statistical analysis 147 generates a histogram over an evaluation window while CTLE circuitry 120 is operating using that set of CTLE parameters. The counts in the selected ranges of bins are then combined by parameter adjustment 150 according to the following:

$$f_{parameter} = \Sigma b_{a,0} + \Sigma b_{a,1} + \Sigma b_{a,2} + \Sigma b_{a,3} - \Sigma b_{t,01} - \Sigma b_{t,12} - \Sigma b_{t,23}$$

In other words, the figure of merit is calculated as the sum of the counts in the selected bins around the decision thresholds minus the sum of the counts in the selected bins around the mean symbol values. Parameter adjustment 150 conducts a search among different CTLE parameters in order to maximize the figure of merit. In other words, the CTLE parameter (e.g., C) value selected is the setting that corresponds to:

$$C = \max_C(f_C)$$

over the search range of $C_{min} \leq C \leq C_{max}$. In an embodiment, parameter adjustment 150 may perform a linear search by stepping the parameter value (e.g., C) from its minimum value to its maximum value in predetermined increments (e.g., 1-bit sized steps).

Different CTLE parameter settings result in different signal amplitudes being provided to ADC 130. Thus, before the figure of merit is calculated for a given parameter setting, parameter adjustment 150 adjusts the gain of input gain circuitry 125 so that the figures of merit can be compared on an equal basis. In particular, the gain of input gain circuitry 125 is iteratively adjusted by parameter adjustment 150 to align one or more peaks in the histogram received from statistical analysis 147 with a reference value. In an embodiment, parameter adjustment 150 iteratively adjusts the gain of input gain circuitry 125 such that the sum of the counts in the bins above a first target amplitude (or reference value) and the sum of the counts in the bins below a second target amplitude (or reference value) are both a target percentage (or rate) of the total number of samples. In an embodiment, for PAM-4 signaling, the first target amplitude is the median amplitude of $s_3$; the second target amplitude is the median amplitude of $s_0$, and the target percentage for each of these bin ranges is 12.5% (and/or a total of 25% for both ranges.)

Figure 4A:
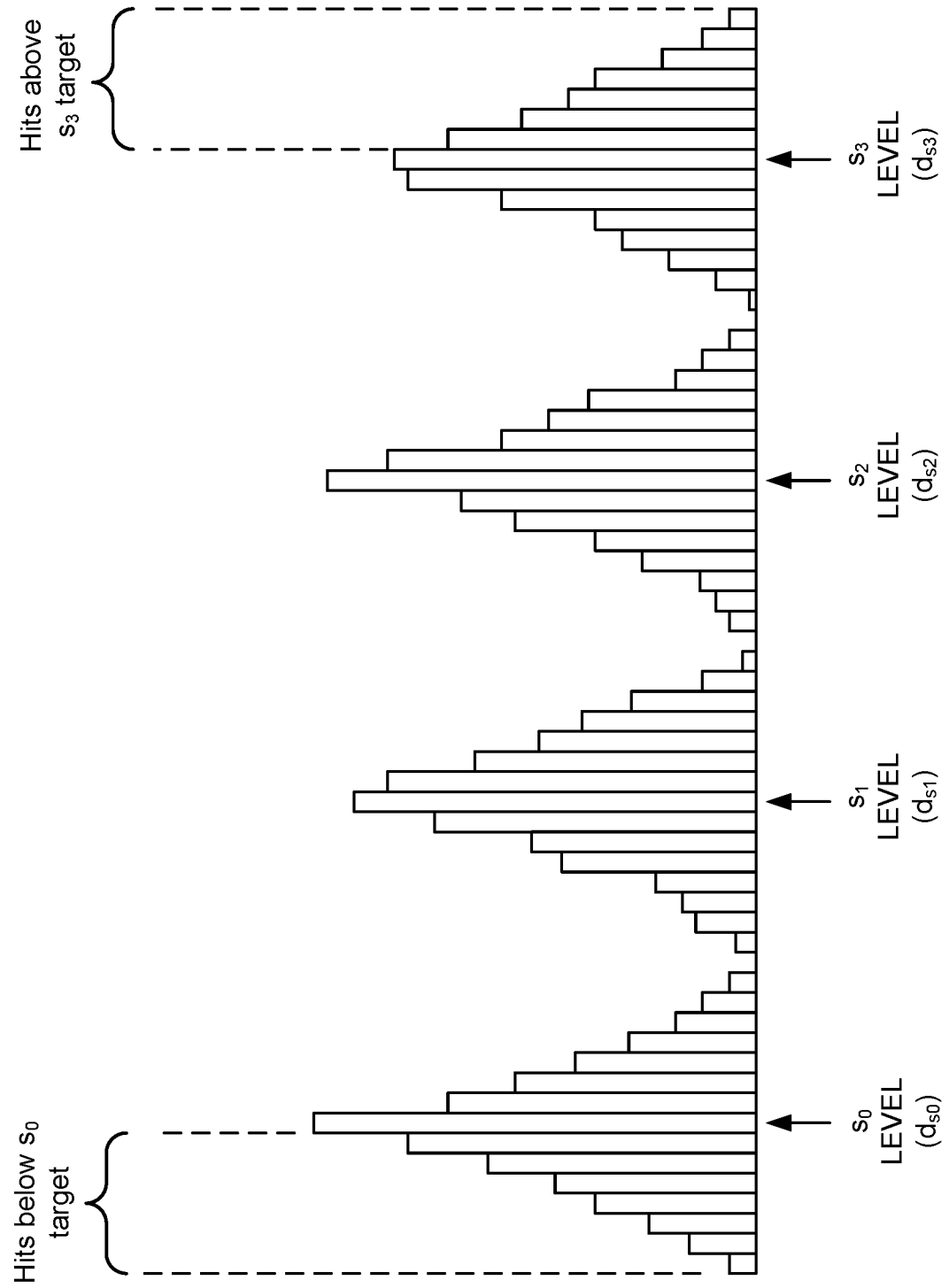
FIGS. 4A-4C are illustrations of sampled signal histograms with varying input gains.
Figure 4B:
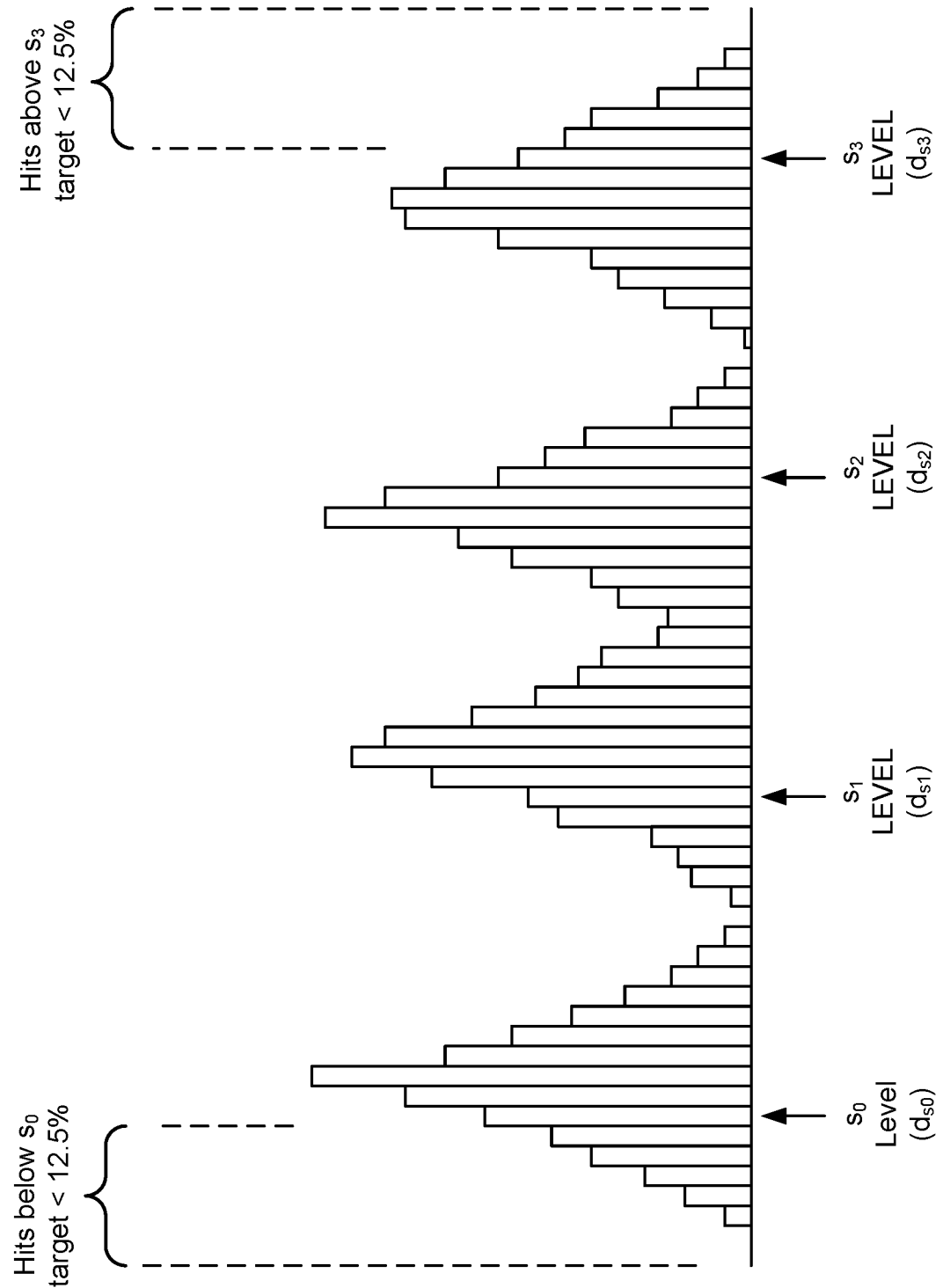
Figure 4C:
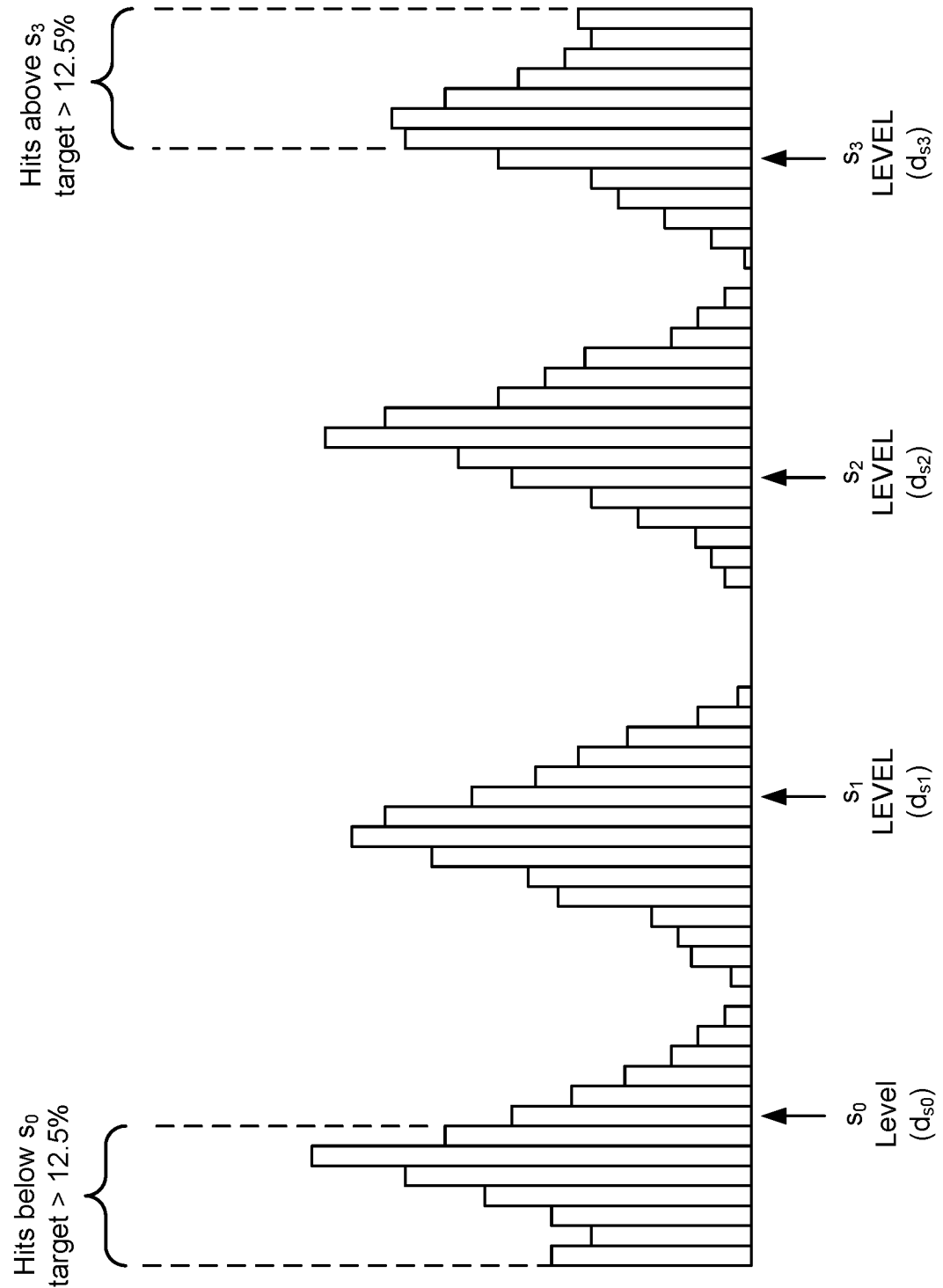

This process is further illustrated with reference to FIGS. 4A-4C. FIGS. 4A-4C are illustrations of sampled signal histograms with varying input gains. FIG. 4A illustrates the ranges of histogram bins that parameter adjustment 150 totals in order to adjust the gain of input gain circuitry 125. In FIG. 4A, the counts in the bins greater than the $d_{s3}$ are summed and compared to a target value that represents the target percentage (e.g., 12.5%) of the evaluation window. Likewise, the counts in the bins less than the $d_{s0}$ are summed and compared to a target value that represents the target percentage (e.g., 12.5%) of the evaluation window. Based on one or more of these comparisons, parameter adjustment 150 changes the gain of input gain circuitry 125 to increase or decrease the counts in these ranges until the target percentage is achieved. In an embodiment, the counts in the bins above $d_{s3}$ and the counts in the bins below $d_{s0}$ are summed to provide a single target percentage (e.g., 25%.)

FIGS. 4B and 4C help illustrate the gain adjustment process. FIG. 4B illustrates a histogram where the input gain is too small and therefore will be increased in the next iteration. FIG. 4C illustrates a histogram where the input gain is too large and therefore will be decreased in the next iteration. As can be seen from the Figures, adjusting the gain of input gain circuitry 125 aligns the peaks associated with $s_0$ and/or $s_3$ with the target reference value $d_{s0}$ and $d_{s3}$.

The process of adjusting the input gain parameter of input gain circuitry 125 may be expressed more formally as follows: Let $T_{adc\_target\_amp}$ denote the target median amplitudes of symbol $s_3/s_0$ ($+3/-3$) for PAM4 mode (or NRZ symbol $+/-1$) at ADC 130 output. The gain of input gain circuitry 125 is adjusted by parameter adjustment 150 such that the number of samples above or below the target amplitude $N_{exceed\_target}$ is at target rate (e.g., a default of 25%) of the total number of samples evaluated. This target rate may be configurable via a register by a host system (not shown in the Figures.) Let $g(k)$ denote the gain of input gain circuitry 125 at a given discrete time k. For input gain circuitry 125 adaptation, two target amplitude thresholds, $T_{neg}$ and $T_{pos}$, and $N_{target}$ are specified as follows: $T_{neg}$ is the target amplitude for PAM-4 symbol $s_3(+3)$ or NRZ symbol+1 (e.g., $T_{neg} = -T_{adc\_target\_Amp}$); $T_{pos}$ is the target amplitude for PAM-4 symbol $s_3(+3)$ or NRZ symbol+1 (e.g., $T_{pos} = T_{adc\_target\_Amp}$); and, $N_{adc\_target}$ is the number of samples that fall into bins for clipping detection, (e.g. $N_{adc\_target} = N_{exceed\_target}$). Let $r_j(k)$ denote the jth ADC 130 output sample in at discrete time $r_j$. An error function can be defined as follows:

$$e(k) = N_{adc\_target} - \sum_{n=k-N_s}^{k} \sum_{j=0}^{15} (r_j(k) > T_{pos}) \text{ or } (r_j(k) < T_{neg})$$

The equation for the update of the gain $g(k)$, for m=0, 1, of input gain circuitry 125 at discrete time k may be given by:

$$g_m(k) = g_m(k-N_s) + \mu_g^m \text{ sign}[e(k)]$$

where $\mu_g^m$ is the step size for gain g.

In an embodiment, after aligning the peaks of the histograms to the targets, parameter adjustment 150 may re-evaluate and/or re-estimate values for the mean symbol values $d_{s0}$, $d_{s1}$, $d_{s2}$, and $d_{s3}$ and/or decision thresholds $d_{t,01}$, $d_{t,12}$, and $d_{t,13}$. These re-estimated values may be used in the selection and generation of the bin ranges for the figure of merit calculations.

In an embodiment, the receiving integrated circuit includes CTLE circuitry 120 that receives at least a first adaptable parameter value from parameter adjustment 150. The CTLE circuitry 120 also receives an input signal from interconnect system 115 and produces a CTLE equalized signal that is provided to input gain circuitry 125. ADC 130 to samples the CTLE equalized signal from input gain circuitry 125 to produce a sampled signal sequence. The sampled signal sequence is provided to data filtering circuitry 140. Data filtering circuitry 140 receives the sampled signal sequence and produces a filtered sampled signal sequence. The filtered sampled signal sequence is provided to statistical analysis 147. Statistical analysis 147 produces a plurality of statistical representations (e.g., histograms) of the sampled signal sequence. These statistical representations are respectively based on a subset of samples (e.g., evaluation windows) from the sampled signal sequence. These statistical representations are provided to parameter adjustment 150. Parameter adjustment 150 includes processing circuitry to receive the statistical representations and calculate respective figures of merit indicators.

Parameter adjustment 150 may have adaptation circuitry to adapt (e.g., find optimized value for) the first adaptable parameter based on at least one of the figure of merit indicators. Respective samples in the subset of samples may be selected for the subset of samples based on one or more succeeding samples in the sampled signal sequence to the respective samples in the subset of samples. The input signal from interconnect system 115 may be a PAM-4 type signal and a respective sample of the subset of samples is selected based on the symbol decision value associated with the immediately succeeding sample in the sampled signal sequence. As discussed herein, the sequence of statistical representations comprises a sequence of histograms of values. Parameter adjustment 150 may also include parameter adaptation circuitry to adapt the gain of input gain circuitry 125 to align a peak in histograms to one or more reference values. Parameter adjustment 150 may also include estimation circuitry to estimate one or more of the symbol amplitude levels $d_{s0}$, $d_{s1}$, $d_{s2}$, and $d_{s3}$ and/or estimate one or more of the decision thresholds $d_{t,01}$, $d_{t,12}$, and $d_{t,13}$ based on at least one of the histograms made after adjustment of the gain of input gain circuitry 125 to align the peak in the histograms to a reference value.

In an embodiment, the receiving integrated circuit includes CTLE circuitry 120. CTLE circuitry 120 includes circuitry to receive an adjustable CTLE parameter from parameter adjustment 150 and circuitry to receive an input signal from interconnect system 115. CTLE circuitry 120 produces a CTLE equalized signal. Front-end input gain circuitry 125 has at least one adjustable gain parameter and receives the CTLE equalized signal to produce a gain adjusted CTLE equalized signal. Input gain circuitry 125 receives the adjustable gain parameter from parameter adjustment 150. ADC 130 samples the gain adjusted CTLE equalized signal and produces a sampled signal sequence.

Statistical analysis 147 produces, over a multiple of sampling windows, a corresponding number of histogram representations of the sampled signal sequence during the sampling windows. These histogram representations are based on a respective filtered sets of samples from the sampling windows that have been filtered by data filtering circuitry 140. Input gain parameter adjustment circuitry in parameter adjustment 150, based on a first subset of the histogram representations, finds a first adjustable gain parameter value for input gain circuitry 125 that aligns a peak in at least one of the histogram representations to a reference value. Adjustable parameter adjustment circuitry in parameter adjustment 150 also, based on a second subset of the histogram representations, finds a CTLE adjustable parameter value that meets an optimization criterion.

Figures of merit values are calculated for each of the second subsets of histogram representations and the optimization criterion is based on the figures of merit. The figures of merit are based on a selected subset of bins in the histogram representations. The second subset of the histogram representations are produced while the CTLE circuitry is being operated using the first adjustable gain parameter value. The filtered set of samples from the respective plurality of sampling windows may be selected for the filtered set of samples based on one or more succeeding samples in the sampled signal sequence. The input signal may be a PAM-4 type signal. The samples of the filtered set of samples may be selected based on a symbol decision value associated with the immediately succeeding sample in the sampled signal sequence.

In an embodiment, system 100 is configured such that data filtering circuitry 140 first receives samples from ADC 130. Data filtering circuitry 140 uses the value of the samples to assign symbol decisions (i.e., symbols) to those samples. Based on the symbol decision assigned to a succeeding sample, data filtering circuitry 140 determines whether to pass the current sampled value on to statistical analysis 147. If the symbol decision for the succeeding sample is $s_0$ or $s_3$, the current sample value will not be passed on to statistical analysis 147 by data filtering circuitry 140. Statistical analysis 147 receives the filtered sequence of sample values and, over an evaluation window (i.e., sampling window based on number of samples, time, etc.), generates a histogram of sample values received. The histograms generated by statistical analysis 147 are provided to parameter adjustment 150. As described herein, based on the histograms, parameter adjustment 150 may adjust one or more CTLE parameters to optimize (e.g., maximize or minimize) a figure of merit or other objective function. This first optimization using the samples output by ADC 130 for the adaptation may be considered a "coarse" adjustment.

After the coarse adjustment using samples output by ADC 130, system 100 adapts one or more digital equalizer circuitry 145 parameters while CTLE circuitry 120 is using the coarsely adapted CTLE parameters. The parameters (e.g., tap weights, soft decision thresholds, etc.) used by digital equalizer circuitry 145 (and/or one or more feed-forward equalization circuits that are part of digital equalizer circuitry 145) may be adapted by system 100 to optimize (e.g., maximize or minimize) a figure of merit or other objective function.

After the digital equalizer circuitry 145 parameters have been adapted, system 100 is configured to re-adapt the CTLE parameter(s) using samples from the digital equalizer circuitry 145 output (rather than the ADC 130 output.) Data filtering circuitry 140 receives equalized samples from digital equalizer circuitry 145. Data filtering circuitry 140 uses the value of the equalized samples to assign symbol decisions (i.e., symbols) to those equalized samples. Based on the symbol decision assigned to a succeeding equalized sample, data filtering circuitry 140 determines whether to pass the current equalized sampled value on to statistical analysis 147. If the symbol decision for the succeeding equalized sample is $s_0$ or $s_3$, the current equalized sample value will not be passed on to statistical analysis 147 by data filtering circuitry 140. Statistical analysis 147 receives the filtered sequence of equalized sample values and, over an evaluation window (i.e., sampling window based on number of samples, time, etc.), generates a histogram of equalized sample values received. The histograms generated by statistical analysis 147 may be provided to parameter adjustment 150. As described herein, based on the histograms, parameter adjustment 150 may adjust one or more CTLE parameters to optimize (e.g., maximize or minimize) a figure of merit or other objective function. This second optimization using the equalized samples output by digital equalizer circuitry 145 may be considered a "fine" adjustment of the CTLE parameters.

Figure 5:
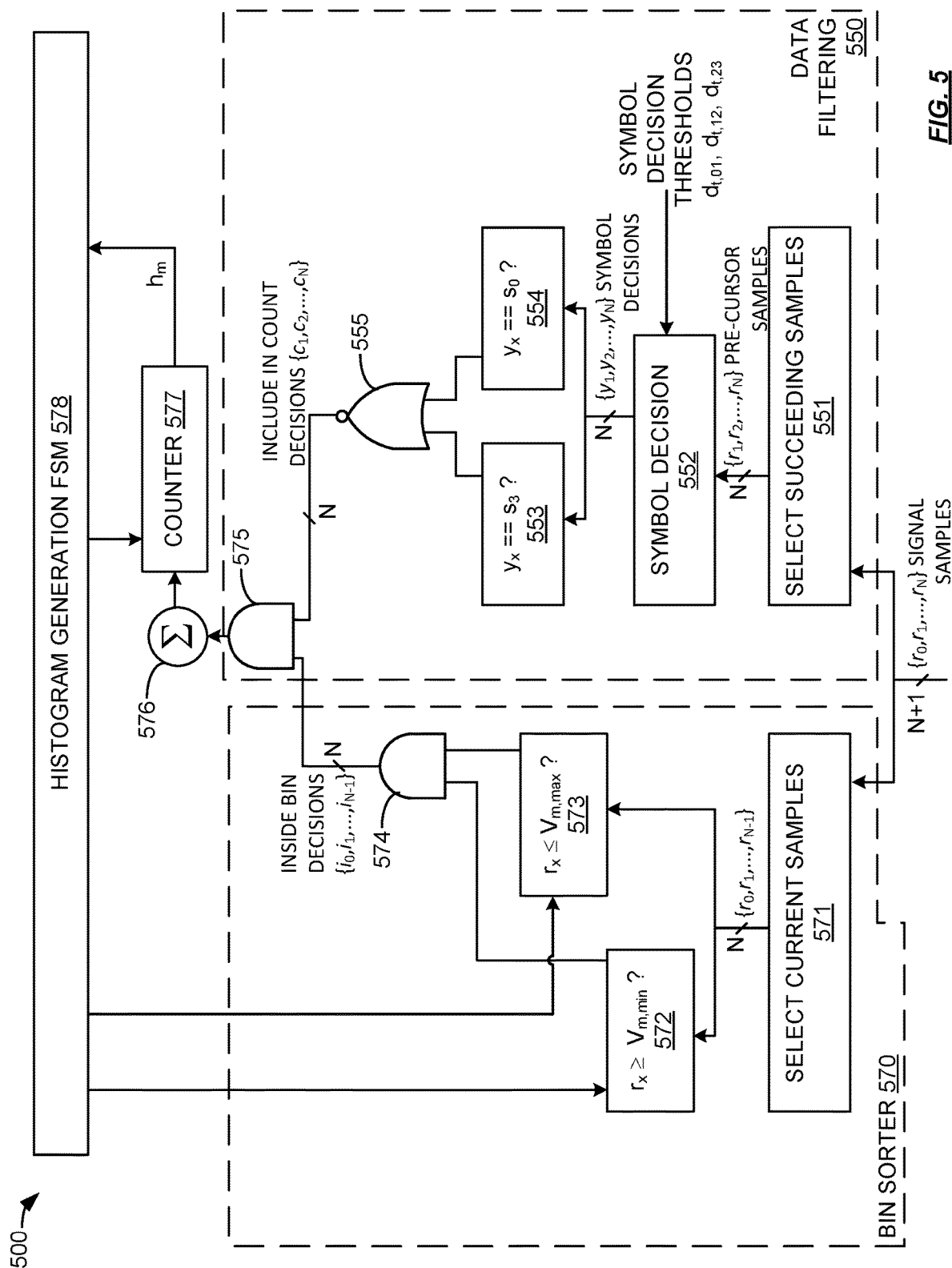
FIG. 5 is a block diagram illustrating histogram generating circuitry.

FIG. 5 is a block diagram illustrating histogram generating circuitry. Histogram generating circuitry 500 includes bin sorting circuitry 570, data filtering circuitry 550, sum circuitry 576, counter 577, and histogram generation finite state machine 578.

Bin sorting circuitry 570 and data filtering circuitry 550 receive a sequence of N+1 sample values $r_0, r_1, \ldots, r_N$. The N+1 sample values $r_0, r_1, \ldots, r_N$ may be received from, for example, ADC 130. In another example, the N+1 sample values $r_0, r_1, \ldots, r_N$ may be received from digital equalizer circuitry 145. In an embodiment, the source of the N+1 sample values $r_0, r_1, \ldots, r_N$ may be configured in a register writable by an external host system (not shown in the Figures.) In an embodiment, the source of the N+1 sample values $r_0, r_1, \ldots, r_N$ may be configured by parameter adjustment 150.

Selector 571 of bin sorting circuitry 570 receives the N+1 sample values $r_0, r_1, \ldots, r_N$ and selects N current samples $r_0, r_1, \ldots, r_{N-1}$ to be sorted. The set of N current sample values $r_0, r_1, \ldots, r_{N-1}$ are provided to bin logic 572 and bin logic 573. Bin logic 572 determines whether particular ones of the N current sample values $r_0, r_1, \ldots, r_{N-1}$ are greater than or equal to the minimum value ($V_{m,min}$) for a particular bin (e.g., bin #m.) Bin logic 573 determines whether particular ones of the N current sample values $r_0, r_1, \ldots, r_{N-1}$ are less than or equal to the maximum value ($V_{m,max}$) for a particular bin (e.g., bin #m.) If a particular one of the N current sample values $r_0, r_1, \ldots, r_{N-1}$ is greater than or equal to $V_{m,min}$ and less than or equal to $V_{m,max}$ for bin #m, and AND-gate 574 indicates that sample is in bin #m. These N number of in-(or out) of bin decisions $i_0, i_1, \ldots, i_{N-1}$ are provided to AND-gate 575.

Selector 551 of data filtering circuitry 550 receives the N+1 sample values $r_0, r_1, \ldots, r_N$ and selects N succeeding samples $r_1, r_1, \ldots, r_N$ for symbol decisions. The set of N succeeding sample values $r_1, r_1, \ldots, r_N$ are provided to symbol decision logic 552. Based on received symbol decision thresholds $d_{t,01}$, $d_{t,12}$, and $d_{t,23}$, symbol decision logic 552 assigns a corresponding symbol decision $y_1, y_1, \ldots, y_N$ to each of the N succeeding sample values $r_1, r_1, \ldots, r_N$. Filtering logic 553, 554, and 555 determine whether particular ones of the N current symbol decision $y_1, y_1, \ldots, y_N$ values are $s_0$ or $s_3$. NOR-gate 555 outputs N count decisions $c_1, c_2, \ldots, c_N$. Count decisions $c_1, c_2, \ldots, c_N$ are provided to AND-gate 575 aligned with inside bin decisions $i_0, i_1, \ldots, i_{N-1}$ such that count decisions $c_2, \ldots, c_N$ indicating the succeeding sample value was an $s_0$ or $s_3$, the corresponding current inside bin decision $i_0, i_1, \ldots, i_{N-1}$ for the current sample value will not be counted by sum circuitry 576 and therefore won't be counted by counter 577 as contributing to bin #m. In other words, c1 is aligned at AND-gate 575 with $i_0$, $c_2$ is aligned with $i_1$, and so on. In an embodiment, bin sorting circuitry 570 is replicated to sort samples in to more than one bin in parallel (e.g., bin #m+1.) Sum circuitry 576 is a per-clock cycle counter that counts the AND-gate 575 decisions (i.e., 'inside bin' and to be counted) over a clock cycle. Counter 577 is an accumulator (or an integrator) which counts the number of AND-gate 575 decisions over multiple clock cycles of an entire histogram generation window. In another embodiment, bin sorting circuitry 570 is reconfigured over sets of N+1 samples to sort samples into bins serially. The output of counter 577, $h_m$, which is provided to histogram generation finite state machine 578 is the number of values falling into bin #m. The aggregate histogram comprising the bins sorted and counted by histogram generating circuitry 500 may be provided to, for example, parameter adjustment 150.

Figure 6:
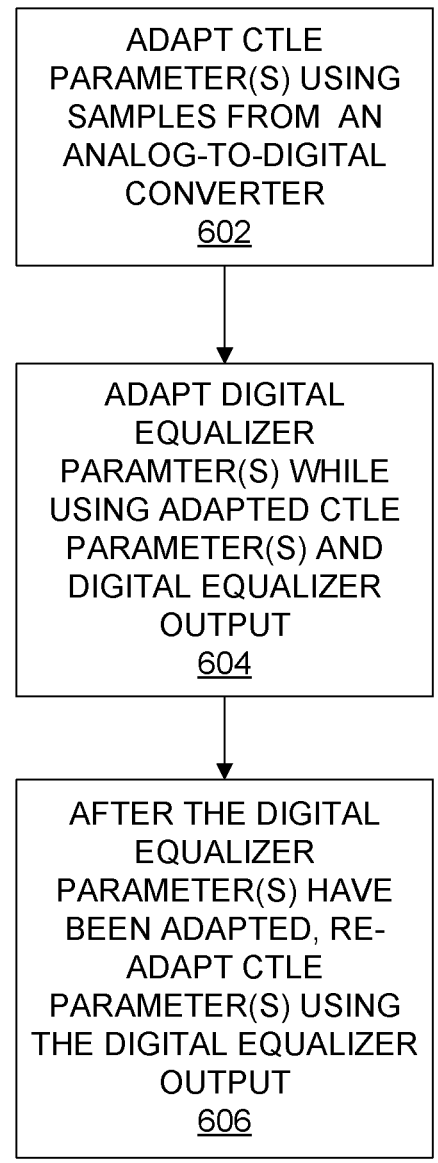
FIG. 6 is flowchart illustrating a method of adjusting a continuous time linear equalizer (CTLE) circuit and a digital equalizer circuit.

FIG. 6 is flowchart illustrating a method of adjusting a continuous time linear equalizer (CTLE) circuit and a digital equalizer circuit. The steps illustrated in FIG. 6 may be performed by, for example, one or more elements of system 100. One or more CTLE parameters are adapted using samples from an analog-to-digital converter (602). For example, data filtering circuitry 140 may receive samples from ADC 130. Data filtering circuitry 140 may use the value of the samples to assign symbol decisions (i.e., symbols) to those samples. Based on the symbol decision assigned to a succeeding sample, data filtering circuitry 140 determines whether to pass the current sampled value on to statistical analysis 147. If the symbol decision for the succeeding sample is $s_0$ or $s_3$, the current sample value will not be passed on to statistical analysis 147 by data filtering circuitry 140. Statistical analysis 147 receives the filtered sequence of sample values and, over an evaluation window (i.e., sampling window based on number of samples, time, etc.), generates a histogram of sample values received. The histograms generated by statistical analysis 147 may be provided to parameter adjustment 150. As described herein, based on the histograms, parameter adjustment 150 may adjust one or more CTLE parameters to optimize (e.g., maximize or minimize) a figure of merit or other objective function. This first optimization using the samples output by ADC 130 may be considered a "course" adjustment.

One or more digital equalizer parameters are adapted while using the adapted CTLE parameters and the digital equalizer output (604). For example, the parameters (e.g., tap weights, soft decision thresholds, etc.) used by digital equalizer circuitry 145 (and/or one or more feed-forward equalization circuits that are part of digital equalizer circuitry 145) may be adapted to optimize (e.g., maximize or minimize) a figure of merit or other objective function.

After the digital equalizer parameters have been adapted, the CTLE parameter(s) are re-adapted using the digital equalizer output (606). For example, data filtering circuitry 140 may receive equalized samples from digital equalizer circuitry 145. Data filtering circuitry 140 may use the value of the equalized samples to assign symbol decisions (i.e., symbols) to those equalized samples. Based on the symbol decision assigned to a succeeding equalized sample, data filtering circuitry 140 determines whether to pass the current equalized sampled value on to statistical analysis 147. If the symbol decision for the succeeding equalized sample is $s_0$ or $s_3$, the current equalized sample value will not be passed on to statistical analysis 147 by data filtering circuitry 140. Statistical analysis 147 receives the filtered sequence of equalized sample values and, over an evaluation window (i.e., sampling window based on number of samples, time, etc.), generates a histogram of equalized sample values received. The histograms generated by statistical analysis 147 may be provided to parameter adjustment 150. As described herein, based on the histograms, parameter adjustment 150 may adjust one or more CTLE parameters to optimize (e.g., maximize or minimize) a figure of merit or other objective function. This second optimization using the samples output by digital equalizer circuitry 145 may be considered a "fine" adjustment of the CTLE parameters.

Figure 7:
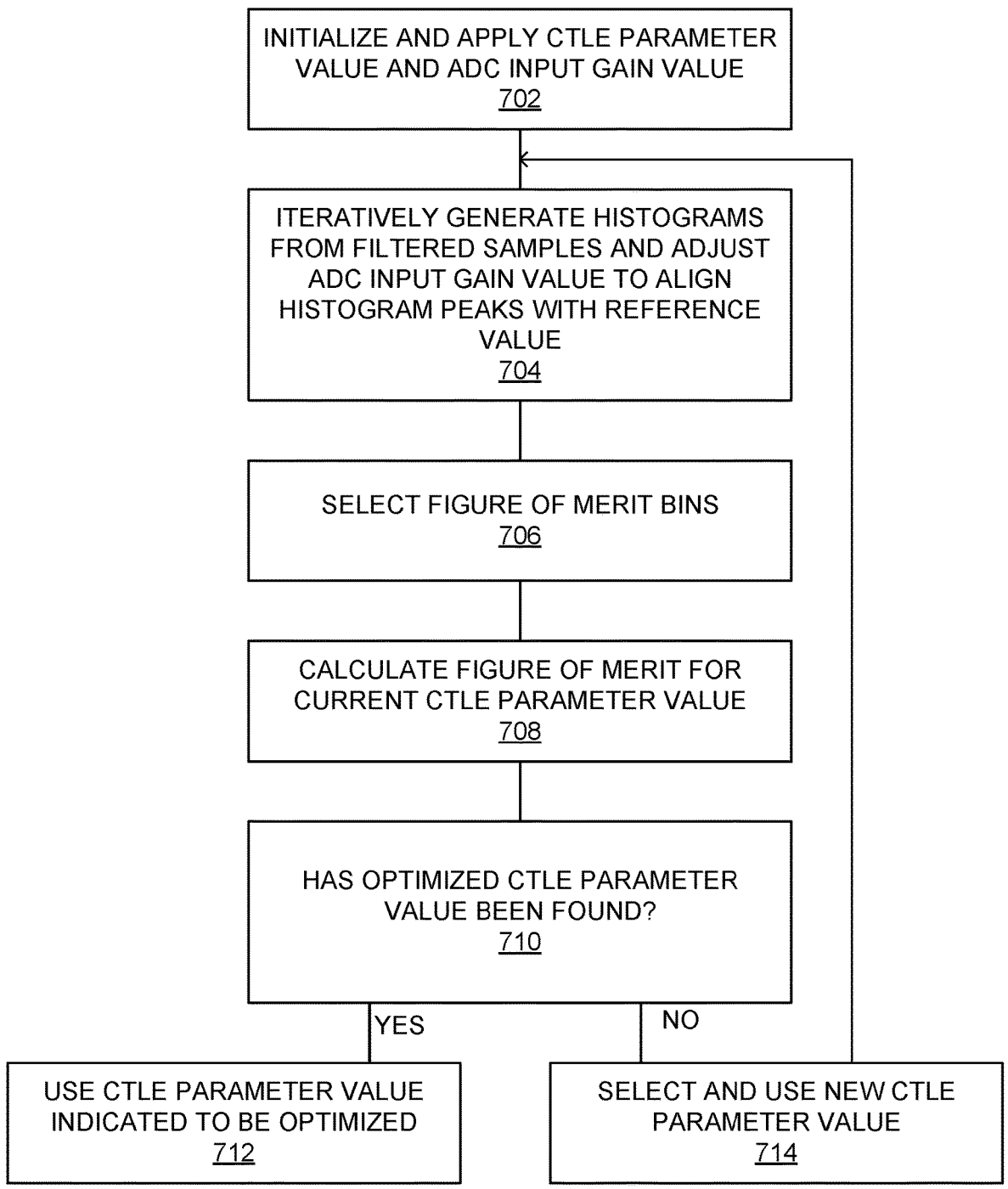
FIG. 7 is a flowchart illustrating a method of adjusting a CTLE circuit.

FIG. 7 is a flowchart illustrating a method of adjusting a continuous time linear equalizer (CTLE) circuit. The steps illustrated in FIG. 7 may be performed by, for example, one or more elements of system 100. A CTLE parameter value and an ADC input gain value are initialized and applied (702). For example, parameter adjustment 150 may set a CTLE parameter of CTLE circuitry 120 and set the gain of input gain circuitry 125.

Histograms are iteratively generated, and the ADC input gain value is iteratively adjusted to align the histogram peaks with a reference value (704). For example, based on histograms received from statistical analysis 147, parameter adjustment 150 may iteratively search for a gain value for input gain circuitry 125 that aligns a peak in the histograms with the mean $s_3$ value and also aligns a peak in the histograms with the mean $s_0$ value. In another example, parameter adjustment 150 may iteratively search for a gain value for input gain circuitry 125 that produces 12.5% of the samples in the histogram equal to or above the mean $s_3$ value and also produces 12.5% of the samples in the histogram equal to or below the mean $s_0$ value. In another example, parameter adjustment 150 may iteratively search for a gain value for input gain circuitry 125 that produces a total percentage of samples above the mean $s_3$ value and below the mean $s_0$ value of 25% (i.e., 12.5%+12.5.%.)

Figure of merit bins are selected (706). For example, after parameter adjustment 150 has aligned the peaks in the histograms, parameter adjustment 150 may select new values for the mean $s_0$, $s_1$, $s_2$, and/or $s_3$ values. These new mean values may be used, for example, to select the bin ranges $b_{a,0}$, $b_{a,1}$, $b_{a,2}$, $b_{a,3}$, $b_{t,01}$, $b_{t,12}$, and/or $b_{t,23}$ that are used in the figure of merit calculation. A figure of merit is calculated for the current CTLE parameter value (708). For example, using a histogram from statistical analysis 147 that was generated while CTLE circuitry 120 was operating with a current CTLE parameter value, parameter adjustment 150 may calculate a figure of merit from that histogram. That figure of merit may be based on the sum of the counts in bins around the decision threshold values subtracted from the counts in the bins around the mean symbol values. In this manner, the figure of merit, when optimized (maximized), maximizes the peak bins around the mean symbol values and minimizes the notch bins between symbol values.

If an optimized CTLE parameter has been found, flow proceeds to box 712. If an optimized CTLE parameter has not been found, flow proceeds to box 714 (710). In box 714, a new CTLE parameter is selected and used (714). Flow then proceeds to box 504. For example, parameter adjustment 150 may continue searching for an optimized CTLE parameter value by adjusting the current CTLE parameter value and then re-evaluating the figure of merit. If an optimized CTLE parameter has been found, the CTLE parameter that is indicated to be optimized is used (712). For example, parameter adjustment 150 may determine the search has found an optimal CTLE parameter (e.g., by having exhaustively tried all value or by detecting a peak in the figure of merit). In response, parameter adjustment 150 applies the CTLE parameter value determined to be optimized to CTLE circuitry 120.

Figure 8:
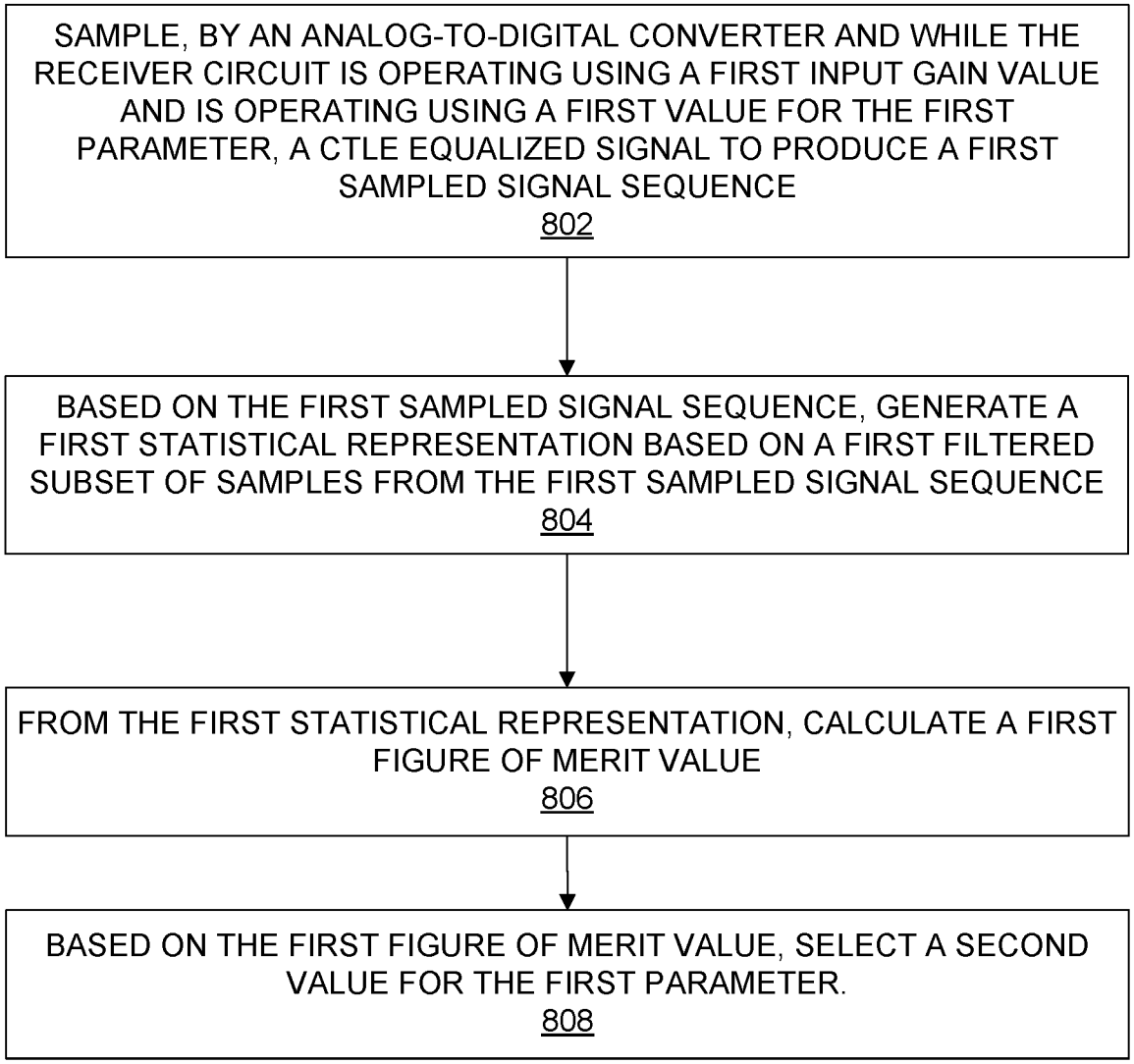
FIG. 8 is a flowchart illustrating a statistical method of adjusting a CTLE circuit.

FIG. 8 is a flowchart illustrating a statistical method of adjusting a CTLE circuit. The steps illustrated in FIG. 8 may be performed by, for example, one or more elements of system 100. By an analog-to-digital converter, and while the receiver circuit is operating using a first input gain value, and is operating using a first value for the first parameter, a CTLE equalized signal is sampled to produce a first sampled signal sequence (802). For example, while CTLE circuitry 120 is operating with a first CTLE parameter received from parameter adjustment 150, ADC 130 may sample, over an evaluation window, a sampled signal sequence.

Based on the first sampled signal sequence, a first statistical representation is generated based on a first filtered subset of samples from the sampled signal sequence (804). For example, based on samples that have been filtered by data filtering circuitry 140, Statistical analysis 147 may generate a histogram of values from the sampled signal sequence. From the first statistical representation, a first figure of merit value is calculated (806). For example, using a received histogram from statistical analysis 147, parameter adjustment 150 may sum the counts in certain bin ranges and subtract the counts in other bin ranges to derive a figure of merit for the current CTLE setting.

Based on the first figure of merit value, a second value is selected for the first parameter (808). For example, based on the figure of merit for the current CTLE setting, parameter adjustment 150 may determine further search for an optimized CTLE setting is warranted. Based on the decision to search additional CTLE setting, parameter adjustment 150 may select a new parameter value to apply to CTLE circuitry 120.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, circuitry 500, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of system 100, circuitry 500, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: An integrated circuit, comprising: continuous time linear equalization (CTLE) circuitry having a first adaptable parameter value, the CTLE circuitry to receive an input signal and to produce a CTLE equalized signal; analog-to-digital converter circuitry to sample the CTLE equalized signal and produce a sampled signal sequence; data filtering circuitry to receive the sampled signal sequence and produce a filtered sampled signal sequence; statistical processing circuitry to receive the filtered sampled signal sequence and produce a first statistical representation of a windowed subset of samples from the filtered sampled signal sequence; and, adaptation circuitry configured to adapt the first adaptable parameter value based at least in part on the first statistical representation of the windowed subset of samples.

Example 2: The integrated circuit of claim 1, wherein the adaptation circuitry is to calculate a figures of merit indicator based on the first statistical representation of the windowed subset of samples.

Example 3: The integrated circuit of claim 1, wherein respective samples in the filtered sampled signal sequence are to be selected for the filtered sampled signal sequence based on one or more succeeding samples in the sampled signal sequence.

Example 4: The integrated circuit of claim 3, wherein the input signal is a PAM-4 type signal and respective samples of the filtered sampled signal sequence are to be selected based on a symbol decision value associated with an immediately succeeding sample in the sampled signal sequence.

Example 5: The integrated circuit of claim 1, wherein the statistical processing circuitry is to produce a plurality of statistical representations from a corresponding plurality windowed subsets of samples from the filtered sampled signal sequence, and the plurality of statistical representations comprises a sequence of histograms of values.

Example 6: The integrated circuit of claim 5, wherein the adaptation circuitry is further configured to adapt a second parameter to align a peak in at least one of the sequence of histograms of values to a reference value.

Example 7: The integrated circuit of claim 6, wherein the adaptation circuitry is further configured to estimate at least one of a symbol amplitude level and a decision threshold based on at least one of the sequence of histograms of values made after adjustment of the second parameter to align the peak in the at least one of the sequence of histograms of values to a reference value.

Example 8: A method of adjusting a first parameter of a receiver circuit that includes continuous time linear equalization (CTLE) circuit that receives an input signal and produces a CTLE equalized signal, comprising: sampling, by an analog-to-digital converter and while the receiver circuit is operating using a first input gain value and is operating using a first value for the first parameter, the CTLE equalized signal to produce a first sampled signal sequence; based on the first sampled signal sequence, generating a first statistical representation based on a first filtered subset of samples from the first sampled signal sequence; from the first statistical representation, calculating a first figure of merit value; and, based on the first figure of merit value, selecting a second value for the first parameter.

Example 9: The method of claim 8, wherein respective samples of the first filtered subset of samples from the first sampled signal sequence are selected based at least one succeeding symbol decision made based on a corresponding at least one succeeding sample in the first sampled signal sequence.

Example 10: The method of claim 8, wherein the first statistical representation comprises a first histogram of values in the first filtered subset of samples.

Example 11: The method of claim 10, further comprising: sampling, by the analog-to-digital converter and while the CTLE circuit is operating using a second input gain value and is operating using a second value for the first parameter, the CTLE equalized signal to produce a second sampled signal sequence; based on the second sampled signal sequence, generating a second statistical representation based on a second filtered subset of samples from the second sampled signal sequence; and, from the second statistical representation, selecting a third input gain value to align a peak in the second statistical representation with a reference value.

Example 12: The method of claim 11, further comprising: sampling, by the analog-to-digital converter and while the CTLE circuit is operating using the third input gain value and is operating using the second value for the first parameter, the CTLE equalized signal to produce a third sampled signal sequence; based on the third sampled signal sequence, generating a third statistical representation based on a third filtered subset of samples from the third sampled signal sequence; and, from the third statistical representation, estimating a symbol amplitude level and a decision threshold.

Example 13: The method of claim 12, further comprising: based on the third statistical representation, the symbol amplitude level, and the decision threshold, calculating a second figure of merit value; and, based on the second figure of merit value, selecting a third value for the first parameter.

Example 14: The method of claim 12, further comprising: sampling, by the analog-to-digital converter and while the CTLE circuit is operating using the third input gain value and is operating using the second value for the first parameter, the CTLE equalized signal to produce a fourth sampled signal sequence; based on the fourth sampled signal sequence, generating a fourth statistical representation based on a fourth filtered subset of samples from the fourth sampled signal sequence; from the fourth statistical representation, calculating a second figure of merit value; and, based on the second figure of merit value, selecting a third value for the first parameter.

Example 15: An integrated circuit, comprising: continuous time linear equalization (CTLE) circuitry having a first adjustable CTLE parameter to receive an input signal and to produce a CTLE equalized signal; front-end input circuitry having at least an adjustable gain parameter to receive the CTLE equalized signal and to produce a gain adjusted CTLE equalized signal; analog-to-digital converter circuitry to sample the gain adjusted CTLE equalized signal and produce a sampled signal sequence; statistical processing circuitry to, over a plurality of sampling windows, produce a plurality of histogram representations of the sampled signal sequence from the plurality of sampling windows, the plurality of histogram representations to be based on samples from a corresponding plurality of filtered sets of samples; gain parameter adjustment circuitry to, based on a first subset of the plurality of histogram representations, find a first adjustable gain parameter value that aligns a peak in at least one of the first subset of the plurality of histogram representations to a reference value; and, parameter adjustment circuitry to, based on a second subset of the plurality of histogram representations, find a first CTLE adjustable parameter value that meets an optimization criterion.

Example 16: The integrated circuit of claim 15, wherein a respective plurality of figures of merit are calculated for each of the second subset of the plurality of histogram representations and the optimization criterion is based on the respective plurality of figures of merit.

Example 17: The integrated circuit of claim 16, wherein the respective plurality of figures of merit are based on a subset of bins in the histogram representations.

Example 18: The integrated circuit of claim 15, wherein the second subset of the plurality of histogram representations is produced while the CTLE circuitry is being operated using the first adjustable gain parameter value.

Example 19: The integrated circuit of claim 15, wherein the corresponding plurality of filtered sets of samples from respective sampling windows are selected for the corresponding plurality of filtered sets of samples based on one or more succeeding samples in the sampled signal sequence.

Example 20: The integrated circuit of claim 18, wherein the input signal is a PAM-4 type signal and a respective sample of the corresponding plurality of filtered sets of samples is selected based on a symbol decision value associated with an immediately succeeding sample in the sampled signal sequence.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
   analog-to-digital converter circuitry configured to sample a gain adjusted continuous time linear equalization (CTLE) equalized signal and produce a sampled signal sequence;
   statistical processing circuitry configured to, over a plurality of sampling windows, produce a plurality of histogram representations of the sampled signal sequence from the plurality of sampling windows;
   gain parameter adjustment circuitry configured to, based on a first subset of the plurality of histogram representations, find a first adjustable gain parameter value that aligns a peak in at least one of the first subset of the plurality of histogram representations to a reference value; and
   parameter adjustment circuitry configured to, based on a second subset of the plurality of histogram representations, find a first CTLE adjustable parameter value that meets an optimization criterion.

2. The integrated circuit of claim 1, wherein a respective plurality of figures of merit are calculated for each of the second subset of the plurality of histogram representations and the optimization criterion is based on the respective plurality of figures of merit.

3. The integrated circuit of claim 2, wherein the respective plurality of figures of merit are based on a subset of bins in the plurality of histogram representations.

4. The integrated circuit of claim 1, wherein the second subset of the plurality of histogram representations is produced while the analog-to-digital converter circuitry is receiving the gain adjusted CTLE equalized signal from amplifier circuitry that is using the first adjustable gain parameter value.

5. The integrated circuit of claim 4, wherein the plurality of histogram representations are based on samples from a corresponding plurality of filtered sets of samples and the gain adjusted CTLE equalized signal is a PAM-4 type signal and a respective sample of the corresponding plurality of filtered sets of samples is selected based on a symbol decision value associated with an immediately succeeding sample in the sampled signal sequence.

6. The integrated circuit of claim 1, wherein the plurality of histogram representations are based on samples from a corresponding plurality of filtered sets of samples and the corresponding plurality of filtered sets of samples from respective sampling windows are selected for the corresponding plurality of filtered sets of samples based on one or more succeeding samples in the sampled signal sequence.

7. The integrated circuit of claim 1, further comprising: digital equalizer circuitry configured to receive the sampled signal sequence.

8. The integrated circuit of claim 7, further comprising: symbol decision circuitry configured to receive an output of the digital equalizer circuitry and provide symbol decisions to additional circuitry.

9. A method of adjusting a first parameter of a receiver circuit, comprising:

sampling, by an analog-to-digital converter and while the receiver circuit is operating using a first input gain value and is operating using a first value for the first parameter, a continuous time linear equalization (CTLE) equalized signal to produce a first sampled signal sequence;

from the first sampled signal sequence, generating, based on at least one succeeding symbol decision, a first selected subset of samples;

generating a first representation based on the first selected subset of samples;

from the first representation, calculating a first figure of merit value; and based on the first figure of merit value, selecting a second value for the first parameter.

10. The method of claim 9, wherein the first representation comprises a first histogram of values in the first selected subset of samples.

11. The method of claim 10, further comprising:

sampling, by the analog-to-digital converter and while the receiver circuit is operating using a second input gain value and is operating using the second value for the first parameter, the CTLE equalized signal to produce a second sampled signal sequence;

based on the second sampled signal sequence, generating a second representation based on a second selected subset of samples from the second sampled signal sequence; and from the second representation, selecting a third input gain value to align a peak in the second representation with a reference value.

12. The method of claim 11, further comprising:

sampling, by the analog-to-digital converter and while the receiver circuit is operating using the third input gain value and is operating using the second value for the first parameter, the CTLE equalized signal to produce a third sampled signal sequence;

based on the third sampled signal sequence, generating a third representation based on a third selected subset of samples from the third sampled signal sequence; and from the third representation, estimating a symbol amplitude level and a decision threshold.

13. The method of claim 12, further comprising:

based on the third representation, the symbol amplitude level, and the decision threshold, calculating a second figure of merit value; and based on the second figure of merit value, selecting a third value for the first parameter.

14. The method of claim 12, further comprising:

sampling, by the analog-to-digital converter and while the receiver circuit is operating using the third input gain value and is operating using the second value for the first parameter, the CTLE equalized signal to produce a fourth sampled signal sequence;

based on the fourth sampled signal sequence, generating a fourth representation based on a fourth selected subset of samples from the fourth sampled signal sequence;

from the fourth representation, calculating a second figure of merit value; and based on the second figure of merit value, selecting a third value for the first parameter.

15. An integrated circuit, comprising:

analog-to-digital converter circuitry configured to sample a continuous time linear equalization (CTLE) equalized signal and produce a sampled signal sequence;

data selection circuitry configured to receive the sampled signal sequence and produce, based on one or more succeeding samples in the sampled signal sequence, a selected sampled signal sequence;

statistical processing circuitry configured to receive the selected sampled signal sequence and produce a representation of a subset of samples from the selected sampled signal sequence; and adaptation circuitry configured to adapt a first adaptable parameter value based at least in part on the representation of the subset of samples.

16. The integrated circuit of claim 15, wherein the representation of the subset of samples comprises a statistical representation of a windowed subset of samples.

17. The integrated circuit of claim 15, wherein the CTLE equalized signal is a PAM-4 type signal and respective samples of the selected sampled signal sequence are to be selected based on a symbol decision value associated with an immediately succeeding sample in the sampled signal sequence.

18. The integrated circuit of claim 15, wherein the statistical processing circuitry is configured to produce a plurality of representations from a corresponding plurality subsets of samples from the selected sampled signal sequence, and the plurality of representations comprises a sequence of histograms of values.

19. The integrated circuit of claim 18, wherein the adaptation circuitry is further configured to adapt a second parameter to align a peak in at least one of the sequence of histograms of values to a reference value.

20. The integrated circuit of claim 19, wherein the adaptation circuitry is further configured to estimate at least one of a symbol amplitude level and a decision threshold based on at least one of the sequence of histograms of values made after adjustment of the second parameter to align the peak in the at least one of the sequence of histograms of values to the reference value.

* * * * *